(No Model.)
R. C. DE LA HUNT.
AUTOMATIC SIPHON FLUSHER.
No. 531,516. Patented Dec. 25, 1894.
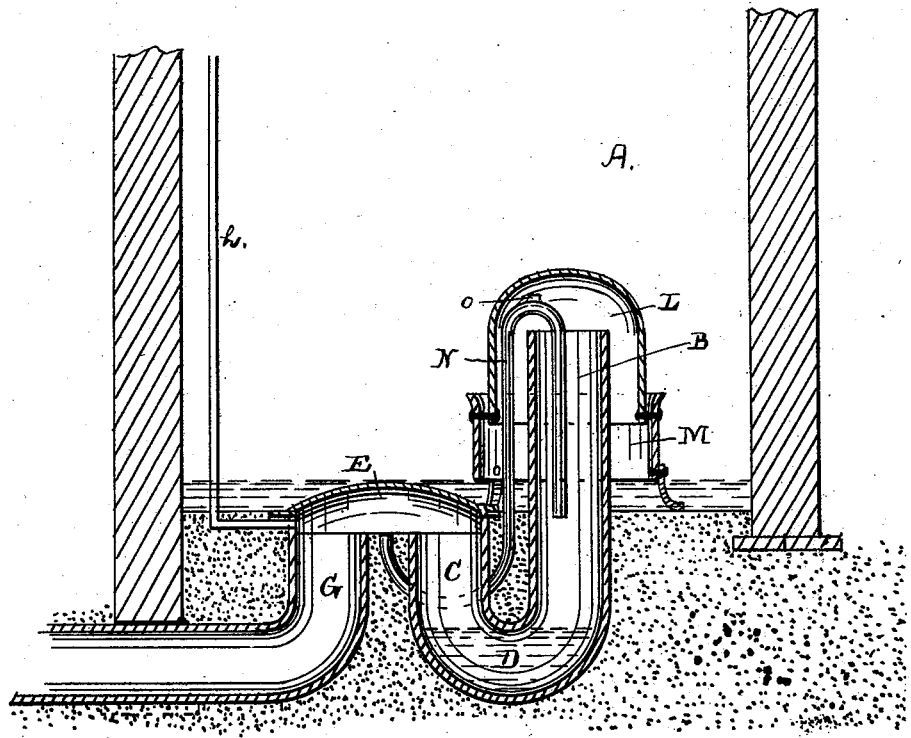

UNITED STATES PATENT OFFICE.

REVERDY C. DE LA HUNT, OF CEDAR RAPIDS, IOWA.

AUTOMATIC SIPHON-FLUSHER.

SPECIFICATION forming part of Letters Patent No. 531,516, dated December 25, 1894.

Application filed October 29, 1892. Serial No. 450,357. (No model.)

*To all whom it may concern:*

Be it known that I, REVERDY C. DE LA HUNT, a citizen of the United States, residing at Cedar Rapids, in the county of Linn and State of Iowa, have invented new and useful Improvements in Automatic Siphon-Flushers, of which the following is a specification.

My invention relates to certain improvements in apparatus for automatically and intermittently discharging the liquid contents of tanks or reservoirs into drain-pipes or sewers.

The invention is clearly shown in the accompanying drawing as when arranged for practical operation.

The letter A designates a tank or reservoir in the bottom of which is vertically fitted the intaking limb B of a discharge-pipe C having a bend or trap D the outer end of which connects with a covered trap E, to which is also connected the upper end of a drain-pipe G. A small pipe h, is vertically arranged in the tank so that a bend formed at its lower end, shall connect with the trap E near a level with the terminal end of the discharge pipe C, to admit air and thus prevent water from being drawn or sucked out of the trap. The said pipe also serves to convey warm air from the sewer to the tank. A bell L is supported over the top of the intaking-limb B, by means of a sleeve M, the feet of which rest on the bottom of the tank A, as shown in the drawing. The inner diameter of the sleeve M is slightly larger in diameter than the outer diameter of the bell, in order to provide for the admission of air, whereby the siphon-pipe N, is recharged whenever the liquid in the tank is reduced to the level of the mouth of the bell. The sleeve N, projecting above and below the mouth of the bell, serves to protect same from any and all floating substances.

The letter N designates an S-shaped siphon-pipe, one end of which enters the intaking limb B of the discharge pipe C and projects downwardly to within a short distance of the level of the water, or seal in the trap D.

The upper bend of the siphon pipe N rises nearly to the crown of the bell and is provided at its highest point with an orifice, or tube o for the passage of air, whereby the operation of the apparatus is rendered more perfect. The lower end of the siphon-tube terminates in the covered-trap E, at, or about the level of the other pipes as clearly shown in the drawing.

In the operation of my invention, the liquid rising in tank A is screened and all floating substances prevented from entering the bell and pipes, by reason of the lower edge of the sleeve M, being below the level of the mouth of the bell. As the liquid rises in the bell it gradually compresses the air therein, until finally the said air escapes through the orifice o, of pipe N, driving outward the liquid contained in the trap thereof. The air pressure in the bell being thus removed the liquid rises therein and flows over the top of the intaking limb, pressing forward the liquid in the trap D until it enters trap E and is discharged therefrom into the drain-pipe G. This flow of liquid continues until the level in the tank has been reduced to the mouth of the bell, when the air rushes downward, between the bell and sleeve thereof and entering the bell breaks the siphonage, when the liquid settles back into the traps of the intaking-limb and pipe N, leaving the apparatus ready for action the moment the liquid in the tank A rises again to the level of the mouth of the bell.

Having described my invention, what I claim as new, and desire to secure by Letters Patent, is—

1. In a flushing apparatus, the combination of a reservoir, an intaking-pipe having a trap formed in the lower part thereof, a bell, and a sleeve connected with the lower part of said bell, so as to leave an open space between the bell and sleeve, the sleeve adapted to project above and below the mouth of the bell, as described, so that the clear liquid shall pass under the sleeve to the bell and intaking pipe, substantially as described.

2. In a flushing apparatus, the combination of a reservoir, a trapped discharge-pipe provided at its inlet with a bell and sleeve, as described, and an S-shaped siphon-pipe having an orifice or tube in its upper bend; the upper leg of the siphon inserted in the inlet of the discharge-pipe and the lower leg thereof terminating in the covered trap, through which the discharge passes to the drain-pipe, substantially as set forth.

3. The combination in a siphon-flusher, of a tank, a vertical intaking-pipe having a trap in the lower part thereof, a bell, and a sleeve for supporting same over the top of the intaking-pipe, a drain-pipe provided with an upwardly turned end, and a covered-trap connecting the drain-pipe and discharge end of the intaking-pipe, with an S-shaped siphon-pipe having one end located in the top of the intaking-pipe, and its opposite end in the covered-trap, an orifice in the upper bend of the siphon-pipe, as described, and a ventilating-pipe connected with the covered trap, substantially as and for the purpose set forth.

In testimony whereof I affix my signature in presence of two witnesses.

REVERDY C. DE LA HUNT.

Witnesses:
    JOE A. EDWARDS,
    LAVINIA MORRISON.